Nov. 11, 1941.     M. M. RHOADES     2,262,251
COMBINED PAY ROLL CHECK AND EMPLOYEE'S EARNING STATEMENT
Filed Jan. 6, 1941     2 Sheets—Sheet 1
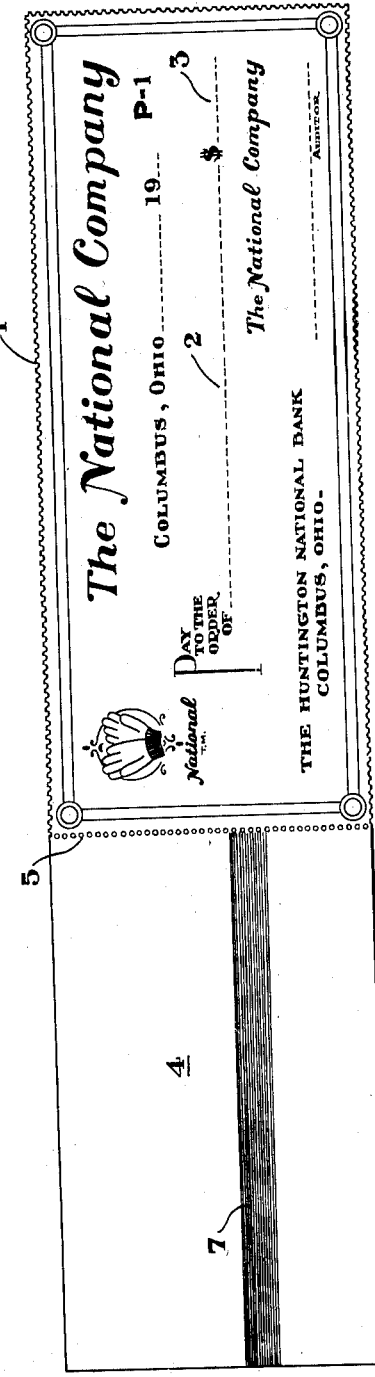
Inventor
MELVILLE M. RHOADES Nov. 11, 1941.   M. M. RHOADES   2,262,251

COMBINED PAY ROLL CHECK AND EMPLOYEE'S EARNING STATEMENT

Filed Jan. 6, 1941   2 Sheets-Sheet 2

FIG. 3.

LEDGER SHEET

EMPLOYEE'S NAME ......... S.S. Nº ......... CO. Nº .........

STREET AND NUMBER ......... POSTOFFICE

DATE OF BIRTH ......... DEPARTMENT

| GROSS EARNINGS | | | | | | DEDUCTIONS | | | | NET PAYM'T | REMARKS |
|---|---|---|---|---|---|---|---|---|---|---|---|
| PERIOD | HOURS | RATE | WAGE | BONUS | TOTAL | S.S. | INS. | HOSP. | MISC. | | |

FIG. 4.

THE NATIONAL COMPANY
COLUMBUS, OHIO.

Statement of Earnings:—   Check Nº P-1

Nº ......... EMPLOYEE'S NAME .........

| GROSS EARNINGS | | | | | | DEDUCTIONS | | | | NET PAYM'T |
|---|---|---|---|---|---|---|---|---|---|---|
| PERIOD | HOURS | RATE | WAGE | BONUS | TOTAL | S.S. | INS. | HOSP. | MISC. | |

*IMPORTANT:— PLEASE DETACH THIS STATEMENT BEFORE PRESENTING.*
*RETAIN THIS STATEMENT FOR FUTURE REFERENCE.*

Inventor
MELVILLE M. RHOADES

By W. S. McDowell
Attorney

Patented Nov. 11, 1941

2,262,251

UNITED STATES PATENT OFFICE 2,262,251

COMBINED PAY ROLL CHECK AND EMPLOYEE'S EARNING STATEMENT

Melville M. Rhoades, Columbus, Ohio

Application January 6, 1941, Serial No. 373,279

4 Claims. (Cl. 282—27)

This invention relates to an improved system for facilitating the maintenance of proper records relating to the payment of employees' wages or salaries, the system providing improved means for disclosing and recording deductions or additions respecting definite returns for labor or services, such as loss of time, governmental insurance or old age payments, union fees, bonus returns, overtime payments and other pertinent data.

The keeping of records and furnishing of reports of this category necessitate a very considerable degree of bookkeeping and clerical effort particularly on the part of employers having large numbers of employees and it is an outstanding object of the present invention to provide means to simplify this procedure, minimize error and reduce incidental costs.

For a further understanding of the invention, reference is to be had to the following description and the accompanying drawings, wherein:

Fig. 1 is a plan view of the combined pay roll check and employee's earning statement formed in accordance with the present invention;

Fig. 2 is a similar view of the reverse side thereof;

Fig. 3 is a plan view disclosing an employer's ledger sheet inserted between the bank check and employee statement section of the instrument so that data inserted in the blanks of the employee's statement will be transferred to appropriate blanks on the ledger sheet;

Fig. 4 is a sectional view on the line IV—IV of Fig. 3.

In carrying out the present invention, I employ a negotiable instrument in the form of a pay roll check I which is of the usual type as to the indicia provided on its front face, containing the name of the employer, the banking institution to which the check is to be presented for payment, a blank 2 for the reception of the employee's or payee's name and a blank 3 for the reception of the figures constituting the amount of money to be paid the payee. Detachably connected with one end of the check I is a stub 4, the latter being joined with the check I by means of a weakened, scored or perforated line 5, so that the check I may be readily detached from the stub 4 when the check is presented to a bank for payment.

The stub 4, in this instance, bears indicia on the under side 6 thereof, constituting an employee's statement of income or earnings for the given period of services represented by the figures on the check section. The normally upper side of the stub section is provided with a bar or stripe 7 of an impression transferring material, known as spot carbon. Similarly, the under side of the check section I, in registration with the payee's name blank 2, is provided with a similar carbon stripe 8.

The under face 6 of the stub section is provided with a line 9 for the reception of the employee's name, and below this line there is printed the captions "Gross earnings," "Deductions" and "Net." Below the caption "Gross earnings" are a series of longitudinally aligned boxes or blanks for the reception of figures disclosing the gross amount of money earned by an employee during a determined period of time, and these boxes or blanks bear the sub-captions "Period," "Hours," "Rate," "Wage," "Bonus" and "Total." In horizontal alignment with these boxes or blanks, and below the caption entitled "Reductions" appears other blanks or boxes which bear the sub-captions "Social Security," "Insurance," "Labor union" and "Miscellaneous." Below the title "Net" appears the sub-title "Payment" and a box or blank is provided below the sub-title "Payment" in which are inserted figures corresponding with the amount to be paid by the check I. These boxes or blanks are filled in by the employer so that with each check, the employee receives a full statement showing total income during a given working period together with authorized reductions made from the gross income and also the net income. This statement is furnished each employee for the purpose of satisfying present legal requirements necessitating the furnishing of an employee with reports setting forth in detail the gross and net income earned.

In using this instrument, the first step consists in folding the stub section along the line 5 so that the face 6 thereof will be disposed immediately below the check section and in registration therewith. The name of the employee is then written or typed into the blank 2 which, through the impression transferring carbon 8 on the under side of the check, transfers the employee's or payee's name to the line 9 of the stub section. Following this operation, the check section is folded so that it underlies the stub section, as indicated in Figs. 3 and 4, and the employer's record, which may be in the form of a loose leaf ledger sheet, as indicated at 10, is placed between the stub and check sections, with the left edge of the ledger sheet acting as a guide, enabling the stub section to be properly registered with the indicia receiving lines II of the ledger sheet. Inasmuch as the stub section is narrower than the width of the ledger sheet, the ends of the lines forming the boxes or blanks on the stub section may be conveniently aligned with the proper spaces or lines on the ledger sheet.

By reason of the carbon stripe 7, which forms a permanent part of the stub section, any indicia or figures entered in the boxes or spaces below the captions or headings appearing on the stub section, will be transferred to the underlying registering boxes or spaces provided by the lines on the ledger sheet, so that by this means, the employer's record will be in exact conformity with the employee's statement. The ledger sheet is then removed and the figures provided in the spaces or boxes entitled "Net payment" may be readily viewed and duplicated on the blank 3 of the check section 1, the blank 3 being exposed since the stub section is of shorter length than the check section.

In view of the foregoing, it will be seen that the present invention provides means by which accurate, readily maintained employment records may be produced, entailing but a minimum of clerical effort to complete the same, and which will furnish all interested parties or agencies a clear understanding of the facts pertaining to the compensation of employees.

What is claimed is:

1. A combined pay roll check and employee's earning statement comprising a paper sheet scored or perforated to produce detachable bank check and employee's earning statement sections, the statement section possessing a shorter length than the bank check section, said bank check section having a blank portion for the reception of an employee's name, the under side of said bank check section in registration with said blank portion being provided with a permanently applied impression-transferring material, a blank portion provided on the under side of the statement section for the reception of the employee's name, said portion being so disposed that when the statement section is folded about said weakened or perforated line to underlie the bank check section, the writing of the employee's name in the blank portion on the bank check section will be transferred to the name-receiving blank portion on said statement section, a row of indicia receiving boxes provided on said statement section adjacent to the name-receiving portion thereon, and a permanently applied impression-transferring material provided on the opposite face of said statement section in registration with said indicia-receiving boxes.

2. A record keeping device comprising a paper strip having a localized transversely extending weakened portion to divide said strip into a pair of sections, the upper side of one section having indicia printed thereon to provide a bank check with a payee's name-receiving portion and the under side of the other section having indicia printed thereon to provide an earning statement with a name-receiving portion and suitably identified indicia-receiving boxes, the distance between the name-receiving portions on the check and statement sections and said weakened portion being equal, a carbon spot on the under side of said check section in registration with the name-receiving portion, a carbon spot on the upper side of said statement section in registration with said indicia-receiving boxes, and a ledger sheet having indicia-receiving boxes correspondingly identified with the boxes on said statement section, the distance between certain boxes on said sheet and an edge of the sheet being equal to the distance between the weakened portion of said strip and the corresponding boxes on said statement section whereby when the strip is folded to position the statement section over the check section and the ledger sheet is disposed therebetween, the engagement of the edge of the ledger sheet with the fold in said strip will cause the registration of corresponding boxes on the statement section and the ledger sheet.

3. A record keeping device comprising a paper strip, means extending transversely of said strip to facilitate folding and separation thereof into a pair of sections, one side of one of said sections having indicia thereon to provide a bank check with a name-receiving blank and the opposite side of the other section having indicia thereon to provide an employee's earning statement with name and indicia-receiving blanks, the name-receiving blanks on said statement and check being spaced equidistantly from said fold facilitating means whereby the blanks will register when the strip is folded to position the statement under the check, and a ledger card having one straight edge and a plurality of columns of indicia-receiving blanks disposed in parallel relation to said straight edge, the spacing between selected blanks on said statement and said fold facilitating means being equal to the spacing between corresponding columns of blanks and said straight edge of said ledger card whereby the engagement of said edge of said ledger card with the fold in said strip produced by arranging the statement over the check will cause the registration of predetermined blanks on said statement and ledger card.

4. A record keeping device comprising a paper strip, means extending transversely of said strip to facilitate folding and separation thereof into a pair of sections, one side of one section having indicia thereon to provide a bank check with a name-receiving blank and the opposite side of the other section having a name-receiving blank and a row of indicia-receiving blanks extending at right angles to said transversely extending fold facilitating means, the name-receiving blanks on said sections being spaced equidistantly from said fold facilitating means to cause registration thereof when the strip is folded on said means to position the statement under the check, and a ledger sheet having a straight edge and a plurality of rows of indicia-receiving blanks extending across the sheet at right angles to said straight edge, the spacing of selected blanks on said statement from said fold facilitating means being equal to the spacing between corresponding blanks in each row on said ledger sheet and said straight edge, the folding of said strip to position said statement over said check providing a fold for engagement by the straight edge of said ledger sheet positioned between said statement and check, said sheet being movable relative to said strip to cause successive registration of the row of blanks on said statement with the rows of blanks on said sheet.

MELVILLE M. RHOADES.